United States Patent
Fries

(10) Patent No.: US 10,647,338 B2
(45) Date of Patent: May 12, 2020

(54) METHOD, CONTROLLER AND SYSTEM FOR DETERMINING THE LOCATION OF A TRAIN ON A TRACK OR OF A BROKEN RAIL OF A TRACK

(71) Applicant: ALSTOM Transport Technologies, Saint-Ouen (FR)

(72) Inventor: Jeffrey M. Fries, Lee's Summit, MO (US)

(73) Assignee: ALSTOM Transport Technologies, Saint-Ouen (FR)

( * ) Notice: Subject to any disclaimer, the term of this patent is extended or adjusted under 35 U.S.C. 154(b) by 163 days.

(21) Appl. No.: 15/899,578

(22) Filed: Feb. 20, 2018

(65) Prior Publication Data
US 2018/0178821 A1   Jun. 28, 2018

(51) Int. Cl.
| B61L 25/02 | (2006.01) |
| B61L 1/18 | (2006.01) |
| B61L 23/04 | (2006.01) |
| H04B 3/48 | (2015.01) |

(52) U.S. Cl.
CPC ............... B61L 25/02 (2013.01); B61L 1/185 (2013.01); B61L 23/044 (2013.01); H04B 3/48 (2013.01)

(58) Field of Classification Search
CPC ........ B61L 25/02; B61L 1/185; B61L 23/044; H04B 3/48
See application file for complete search history.

(56) References Cited

U.S. PATENT DOCUMENTS

| 2002/0113170 A1* | 8/2002 | Grappone | B61L 23/041 246/120 |
| 2003/0038216 A1* | 2/2003 | Holgate | B61L 23/044 246/122 R |
| 2006/0060724 A1* | 3/2006 | Francis | B61L 1/18 246/122 R |
| 2008/0142645 A1* | 6/2008 | Tomlinson | B61L 1/181 246/122 R |
| 2012/0138752 A1* | 6/2012 | Carlson | B61L 1/164 246/126 |
| 2013/0334373 A1* | 12/2013 | Malone, Jr. | B61L 23/044 246/2 R |
| 2016/0075356 A1* | 3/2016 | Kull | B61L 23/044 246/121 |
| 2016/0107664 A1* | 4/2016 | Kull | B61L 23/044 246/121 |

FOREIGN PATENT DOCUMENTS

| WO | 2004/071839 A1 | 8/2004 |
| WO | 2007/134992 A1 | 11/2007 |

* cited by examiner

*Primary Examiner* — Jeff W Natalini
(74) *Attorney, Agent, or Firm* — Thompson Coburn LLP; Steven M. Ritchey

(57) ABSTRACT

The present invention relates to a method for determining the location of a train on a track or of a broken rail of a track, the track including a first section having a first end and a second end, the method including:
injecting a current into the track at one end of the first end and second end;
detecting the amplitude of the injected current at the same end at which the current was injected; and
determining, based on the detected amplitude, the location of the train on the track or of the broken rail of the track.

13 Claims, 2 Drawing Sheets

METHOD, CONTROLLER AND SYSTEM FOR DETERMINING THE LOCATION OF A TRAIN ON A TRACK OR OF A BROKEN RAIL OF A TRACK

FIELD OF THE INVENTION

The present invention concerns method for determining the location of a train on a track or of a broken rail of a track. Further, the present invention relates to a controller for determining the location of a train on a track or of a broken rail of the track. Finally, the present invention relates to a system for determining the location of a train on a track or of a broken rail of a track.

BACKGROUND OF THE INVENTION

Railroads that have implemented Positive Train Control systems (e.g., ITCS, ETCS, I-ETMS etc) as overlays to existing signal systems, will ultimately desire to move towards a virtual signal system where no physical signals exist. Virtual signal systems can allow railroads to realize more capacity without having to physically install more signals and shorten existing signal blocks. Virtual signal systems also eliminate the maintenance associated with physical signals (for example replacing lamps, aligning signals, cleaning lenses, etc). In order to realize virtual signaling, the location of the front and rear of the train must be known as well as the integrity of the rail between trains.

WO2004/071839 A1 relates to a system for automatically detecting the presence of a train located within a detection or surveillance area of a railroad track associated with a railroad grade crossing. The system includes a transmitter unit that transmit a detection signal and a receiver that receives a detection signal.

WO 2007/134992 A1 relates to a device for detecting the occupied or free status of a section of track by means of a track current circuit including both rails of the section of track into which a transmitter introduces a transmitted signal which is supplied to at least one receiver via the track current circuit.

SUMMARY OF THE INVENTION

According to one aspect, a method for determining the location of a train on a track or of a broken rail of a track is provided, the track including a first section having a first end and a second end, the method including:
injecting a current into the track at one end of the first end and second end;
detecting the amplitude of the injected current at the same end at which the current was injected; and
determining, based on the detected amplitude, the location of the train on the track or of the broken rail of the track.

Further embodiments may relate to one or more of the following features, which may be combined in any technical feasible combination:
a first current is injected at the first end, wherein the location of the first end of the train on the track is determined, wherein the first end detection is based on the detected amplitude of the first current at the first end;
a second current is injected at a second end, wherein the location of the second end of the train on the track is determined, the second end of the train being, in driving direction, opposite to a first end, wherein the second end detection is based on the detected amplitude of the second current at the second end;
the injected current is a pulsed DC current;
the determination of the location of the train on the track or of the broken rail of the track is further based on the nominal reception level of the detected amplitude, which corresponds to a nominal amplitude, when no train is in the first section and the rails are not broken, and a maximal level, when an axle of the train is positioned adjacent to the end, where the respective current is injected;
the nominal reception level is adapted, in particular in regular time intervals;
the method further comprises determining a change of the amplitude with respect to the time of the at least one current, and determining the direction of travel on the train based on the change of amplitude;
when the train is traveling from the first end to the second end, at least one of the amplitude of a second current injected and detected at the second end of the first section increases; and the amplitude of a first current injected and detected at the first end of the first section decreases;
when a train is traveling from the first end to the second end of the first section, the method further comprising: recording the amplitude of a detected first current at the first end, wherein the first current was injected at the first end;
detecting that the amplitude of the first current at the first end drops below a first nominal reception level corresponding to a detected amplitude of the first current at the first end, when no train is present on the first section and the rails are not broken; determining, in case the first amplitude of the first current at the first end has dropped below the nominal reception level, that a rail has been broken, determining the location of the broken rail, in case it has been determined that the rail has been broken, based on the recorded amplitude of the first current at the first end, at the time where or immediately before the amplitude drops below the first nominal reception level; and/or
the determination of the location of the broken rail is further based on based on the detected first current falling below a minimum threshold, when the last axle of the train has just passed the broken rail location.

According to another aspect, a controller is provided for determining the location of a train on a track or of a broken rail of a track, the track including a first section having a first end and a second end, the controller being adapted to be connected to a first transmitter and first detector, the first transmitter and the first detector being located at the first end of the first section, wherein the first transmitter is adapted to inject a first current at the first end into the track, the first detector being adapted to detect an amplitude of the first current emitted by first transmitter, wherein the controller is adapted to receive, from the first detector, the detected amplitude of the first current, which was transmitted at the same end, and to determine, based on the at least one detected amplitude of the first current, the location of a first end of the train on the track directed to the first end of the section or of the broken rail of the track.

Further embodiments may relate to one or more of the following features, which may be combined in any technical feasible combination:
the controller is adapted to be connected to a second transmitter and second detector respectively located at the second end of the first section, wherein the second transmitter is adapted to inject a second current at a second end and the second detector being adapted to detect an amplitude of the second current emitted by second transmitter, wherein the controller is adapted to determine a location of a second end of the train on the track directed towards the second end of the section, the second end of the train being, in driving direction, opposite to the first end based on the detected amplitude of the second current at the second end; and/or the determination of the location of the first end of the train on the track or of the broken rail of the track is further based on the nominal reception level of the at least one detected amplitude, which corresponds to a predefined or observed amplitude, when no train is in the first section and the rails are not broken, and a maximal level, when an axle of the train is positioned adjacent to the end, where the respective current is injected.

According to another aspect, a system is provided for determining the location of a train on a track or of a broken rail of a track, the track including a first section having a first end and a second end, the system comprising a first transmitter and a first detector at the first end of the first section and a controller being connected to the first transmitter and the first detector, wherein the first transmitter is adapted to inject a first current at the first end into the track, the first detector being adapted to detect an amplitude of the first current emitted by first transmitter, wherein the controller is adapted to receive, from the first detector, the detected amplitude of the first current, which was transmitted at the same end, and to determine, based on the at least one detected amplitude of the first current, the location of the train on the track or of the broken rail of the track.

BRIEF DESCRIPTION OF THE DRAWINGS

Further advantages, features, aspects and details are evident from the dependent claims, the description and the drawings. The accompanying drawings relate to embodiments of the invention.

DETAILED DESCRIPTION OF THE INVENTION

So that the manner in which the above recited features of the present invention can be understood in detail, a more particular description of the invention, briefly summarized above, may be read by reference to embodiments.

Figure 1:
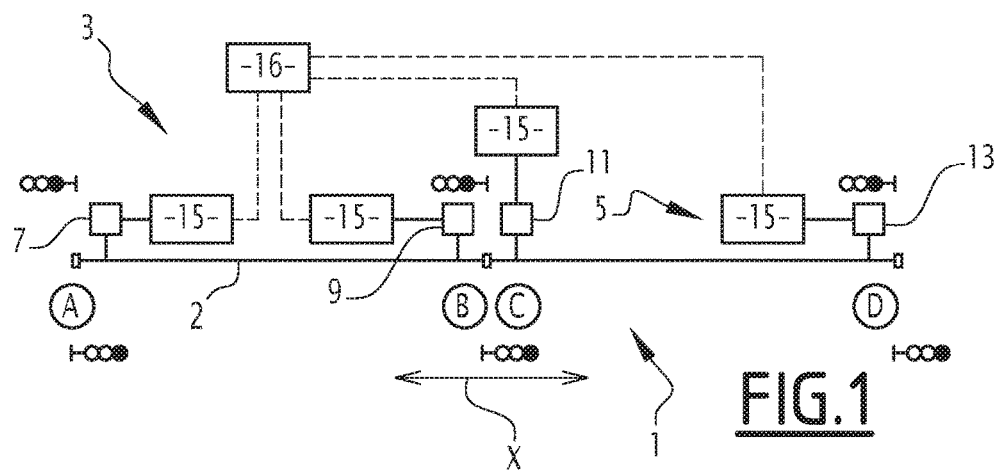
FIG. 1 shows schematically a track of a railway.

FIG. 1 shows an example of a railway track 1. The railway track has two parallel rails (not shown). The railway track 2 is divided in several sections or blocks 3, 5 in the movement direction X of the trains. FIG. 1 shows a first section 3 and a second section 5. Each section 3, 5 includes a first end A, C and a second end B, D. The first end C of the second section 5 is arranged adjacent to the second end B of the first section 3. The rails of each section 3, 5 are insulated electrically from the rails of another section 3, 5 in the movement direction X of a train. In other words, the joints of the rails between the first section 3 and the second section 5 are insulated.

At each end A, B, C, D of a section a transceiver 7, 9, 11, 13 is provided, which is connected to the rails or both rails of the track 1 to transmit and receive electric signals. For example a first transceiver 7 is provided at the first end A of the first section 3, a second transceiver 9 is provided at a second end B of the first section 3, a third transceiver 11, is provided at the first end C of the second section 5 and the fourth transceiver 13 is provided at the second end D of the second section 5. Each transceiver 7, 9, 11, 13 includes a transmitter and receiver or detector. In some embodiments, the transmitter and the receivers or detectors are provided in different devices.

The transmitter is provided to transmit signals over the track and the respective detector is adapted to detect signals transmitted by one of the transmitters of the same section 3, 5. For example, the first transceiver 7 is adapted to detect signals transmitted or emitted by the first transceiver 7, in case the signal is short circuited by an axle of a train or a shunt resistance at the second end B of the first section. In an embodiment, the second transceiver 9 may act as a shunt resistance. Further, the first transceiver 7 is adapted to detect signals transmitted or emitted by the second transceiver 9.

The transceivers 7, 9, 11, 13 are respectively connected to a controller 15. The controller 15 is adapted to control the transceivers 7, 9, 11, 13, in particular to command the transmission of a signal by a transmitter of the transceivers 7, 9, 11, 13 and/or to receive a detected signal from the detectors of the transceivers 7, 9, 11, 13. The controllers 15 may be connected to a central controller 16, in particular for communicating the detected signals.

According to an embodiment, the transceivers 7, 9, 11, 13 transmit DC coded information. The information may be used to determine the presence of trains and/or broken rails between insulated joint locations and communicate that information to an adjacent transceiver. For example, in an embodiment the signals are used for a track circuit. Further the code may be used to distinguish emitted signals of different transceivers.

Figure 2:
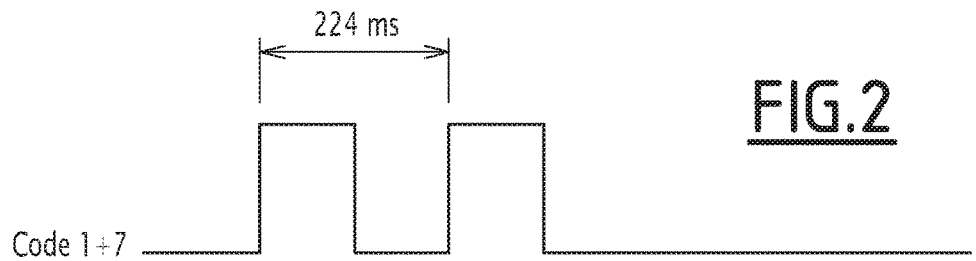
FIG. 2 shows schematically a signal injected into the track.

FIG. 2 shows an example of a signal transmitted by one of the transmitters. The signal is a baseband signal comprising one or more DC pulses. FIG. 2 shows two DC pulses. In other embodiments, the signal may include even more or less DC pulses. In yet other embodiments the pulses may include DC pulses of different amplitudes or polarities. In some embodiments, the DC pulses are analyzed for their aspect information. For example, timing associated with the received pulses (e.g. width, polarity, amplitude, distance between edges, etc) is used to convey the aspect information.

In case a train is present on the first section 3, the axles of the train create an electrical connection between the first rail and the second rail of the track. In other words, the axles of the train create a short circuit between both rails of a track. Thus, for example, the signals transmitted by the first transceiver 7, in particular the transmitter of the first transceiver, in a first rail does not reach the second transceiver 9, but flows through the train shunt and back through the second rail. The value is sensed at the location of the first transceiver by a detector or current sensor. The detected amplitude of the transmitted signal, also called transmitted current or transmitted DC current, changes based on the presence of the train shunt. In other words, the voltage that is transmitted is constant, but as the load impedance changes based on train position, the transmitted current will increase or decrease. The same applies for the signals emitted or transmitted by the second transceiver 9. The amplitude of the transmitted signal depends on the location of the first and the last wheel of the train.

In case the train is driving from the first end A to the second end B of the first section 3, the closer the last axle of the train is located towards the first end A, the higher is the transmitted DC current or the amplitude of the DC pulses transmitted by the first transceiver 7. Then, the second transceiver 9 is not any more capable to receive the signals emitted by the first transceiver 7. Similarly, the closer the first axle of the train is located towards the second end the higher is the transmitted DC current or the amplitude of the DC pulses by the second transceiver 9. Then, the first transceiver 7 is not any more capable to receive the signals emitted by the second transceiver 9.

The same applies for the third and fourth transceivers 11, 13 of the second section 5 of the track 1.

In some embodiments, a fixed detection threshold DT is set such that if the received current from another transceiver falls below this threshold, or if the aspect information cannot be determined, the system, in particular the respective controller 15, or track circuit assumes either a train is in the section or block, or a broken rail exists and the railway signals are set to their most restrictive state, disallowing any trains from entering that section or block from either end.

Figure 3:
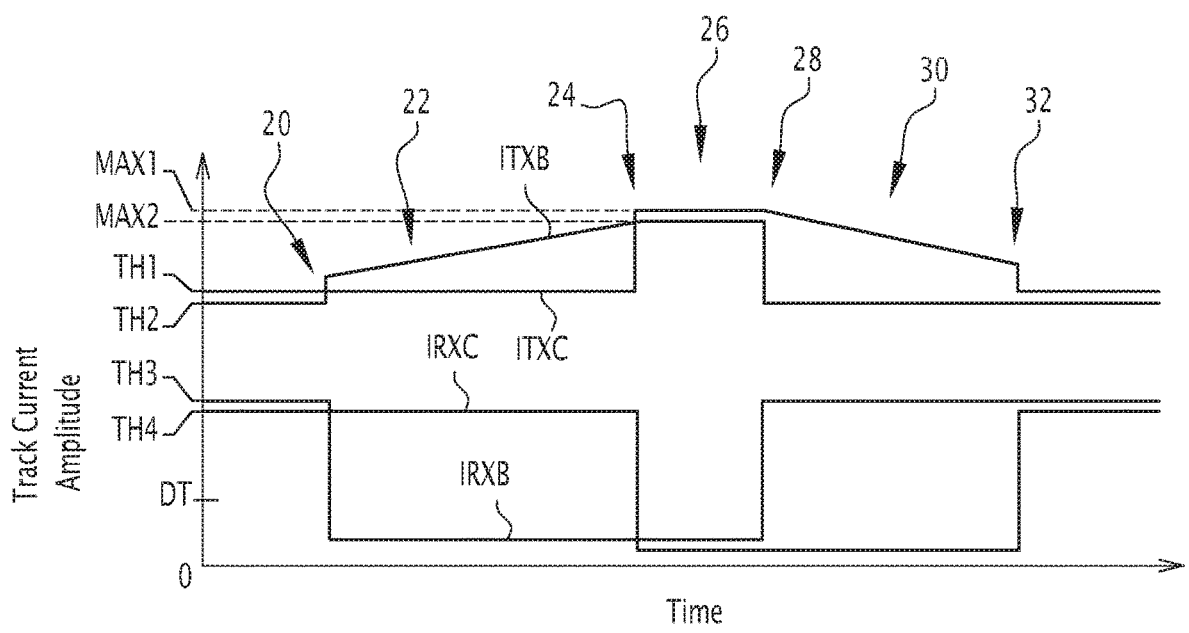
FIG. 3 shows schematically amplitudes of transmitted and received currents over time, when a train moves on along the track.

FIG. 3 shows the amplitudes of the detected currents in the track, in particular ITX B shows the amplitude of the DC current or DC pulses transmitted by the second transceiver 9. This detected current may be also called transmit current of the second transceiver 9. IRX B shows the amplitude of the DC current or DC pulses received by the second transceiver 9, which was emitted by the first transceiver 7. This detected current may be also called received current of the second transceiver 9. ITX C shows the amplitude of the DC current or DC pulses transmitted by the third transceiver 11. This detected current may be also called transmit current of the third transceiver 11. IRX C shows the amplitude of the DC current or DC pulses detected by the third transceiver 11, which was emitted by the fourth transceiver 13. This detected current may be also called received current of the third transceiver 11. The horizontal axis shows the time and the vertical axis shows the amplitude as an entire train moves into the first end A of the first section 3 through the second end D of the second section 5. It should be noted that in FIG. 3 the amplitudes of the DC currents is shown. In other words, if the current signals include a pulsed signal, the curves shown in FIG. 3 correspond to the amplitude of the pulses.

Each current has a standard reception level TH1, TH2, TH3, TH4, which corresponds to a nominal level or amplitude, when no train is in the respective section and the rails of the railway track 1 are not broken. It should be noted that this nominal level may change over time due to changes in the track circuit (for example ballast or series resistance). Further, according to embodiments the maximal level of the detected currents, which are emitted from the same transceiver 7, 9, 11, 13 are known and stored by the controller 15. The maximal level corresponds to an amplitude when an axle of the train is positioned adjacent to the end, where the respective current is injected. The level MAX 2 of the detected transmit current ITX B from the second transceiver 9 is determined when a train is positioned at the second end B of the first section 3 and MAX 1 of the detected transmit current ITX C is determined when a train is positioned at the first end C of the second section 5.

According to an embodiment, the controller 15 adapt to changes in the nominal levels or amplitudes TH1, TH2, TH3, TH4, MAX1 and/or MAX2 based on changes in the track circuit over time. For example the controller 15 may adapt the nominal levels in fixed time intervals. In other embodiments, the nominal levels may be adapted based on the relation between at least two values, for example between MAX1 and TH1. For example, in some embodiments a learning algorithm may be used for adapted the nominal levels or amplitudes.

In an embodiment, the level MAX 2 of the detected transmit current ITX B from the second transceiver 9 and MAX 1 of the detected transmit current ITX C is determined and stored by the controller 15. The standard reception levels and the maximal levels of the detected DC currents or DC pulses may be automatically determined by the controller 15, for example in a learning session. The nominal levels may, in an alternative embodiment, also be stored and determined in the central controller 16.

According to embodiments, the controller 15 is adapted to receive the detected DC currents or the amplitudes from the transceivers 7, 9, 11, 13. To determine whether a train and/or broken rail is present in a block or section (between track circuit transceivers) the transmitted currents are observed. In an alternative embodiment, this may be determined in the central controller 16.

Now, different sections of the curves in FIG. 3 will be explained. At 20, the front of the train has not entered the first section 3 between transceivers 7 and 9. The level of current ITX B is relatively stable at the standard reception level TH2. The level of the current IRX B is also relatively stable at the standard reception level TH3 and well above the detection threshold DT indicating that no train is present in the first section or block 3. In other words, the levels detected by the transceivers 9 and 11 correspond to the standard reception levels TH1, TH2, TH3, TH4.

At 20, the front of the train enters the first section or block between the first transceiver 7 and the second transceiver 9. Initially the transmit current ITX B from the second transceiver 9 jumps up slightly as the front of the train presents a lower shunt impedance to the second transceiver 9 than does the first transceiver 7 at the first end A of the first section. As the front of the train progresses towards the second transceiver 9, the transmit current ITX B at the second transceiver 9 increases substantially at 22 based on the location of the front of the train relative to the second transceiver 9. According to some embodiments, the controller 15 is adapted to use the current level of ITX B at the second transceiver 9 to approximate the location of the front of the train. For example, the controller 15 may not only calculate the location of the train, in particular of the front of the train based on the actual transmit current amplitude of ITX B between the standard reception level TH2 and the maximal level MAX2, but in particular also based on the standard reception level TH2 and the maximal level MAX2 of the transmit current ITX B. In some embodiments the receive currents IRX are used as an additional check to activate the use of the transmit currents ITX, to determine a location of the train. In an alternative embodiment, the central controller 16 may determine the location of the train.

It should be noted that a rising current (with respect to the time) of a signal transmitted and detected by the same transceiver, here transceiver 9, indicates that a train, in particular the front of the train, is travelling towards that transceiver. In the opponent case, a falling current with respect to the time of a signal transmitted and detected by the same transceiver indicates that a train, in particular the rear of the train, is moving away from the respective transceiver.

The received current IRX B at the second transceiver 9, which is emitted by the first transceiver 7 is well below the detection threshold (nearly zero) the entire time the train occupies the block between transceivers 7 and 9.

At 24, the front of the train leaves the first section 3 and enters the second section 5. Thus, the current ITX C at the third transceiver 11 jumps up, and the current IRX C at the third transceiver 11, which was emitted by the fourth transceiver 13 drops well below the detection threshold.

At 26, the entire length of the train traverses the location of the second transceiver 9. During this time the detected current ITX B at the second transceiver tapers off to some relatively stable level until the rear of the train clears the first section 3 or block between first and second transceivers 7, 9.

At 28, the rear of the train has left the first section 3. The detected transmit current ITX B at the second transceiver 9 drops slightly back to the standard level TH2 and the detected receive current IRX B, which was emitted by the first transceiver 7, jumps back up to the standard level TH3 which they were before the train entered the second section 3.

At 30, the rear of the train traverses the second section 5 between the third transceiver 11 and the fourth transceiver 13. As the rear of the train progresses away from the third transceiver 11, the detected transmit current ITX C at the third transceiver 11 decreases based on the location or the rear of the train relative to the third transceiver 11. According to some embodiments, the controller 15 is adapted to use the current level of ITX C at the third transceiver 11 to approximate the location of the rear of the train. The detected receive current IRX C at the third transceiver is still well below the detection threshold DT (nearly zero). For example, the controller 15 may not only calculate the location of the train, in particular of the rear of the train based on the actual transmit current amplitude of ITX C between the standard reception level TH1 and the maximal level MAX1, but in particular also based on the standard reception level TH1 and the maximal level MAX1 of the transmit current ITX C. In an alternative embodiment, the central controller 16 may perform these calculations.

At 32, the rear of the train has cleared the second section between the third and fourth transceivers 11, 13. The detected transmit current ITX C at the third transceiver 11 drops slightly back to the standard level TH1 and the detected receive current IRX C, which was emitted by the fourth transceiver 13, jumps back up to the standard level TH4 which they were before the train entered the second section 5.

According to embodiments, the level of the detected transmit current, for example ITX C or ITX B can be used to locate to the front and the rear of the train as it passes through a section 3, 5. Further, the direction can be also determined based upon the determination whether the detected transmit currents rises or falls, as explained above. It should be noted that the same applies for the not shown (transmit) current detected by the first transceiver 7, which where emitted by the first transceiver 7, and the current detected by the fourth transceiver 13, which where emitted by the fourth transceiver 13.

Figure 4:
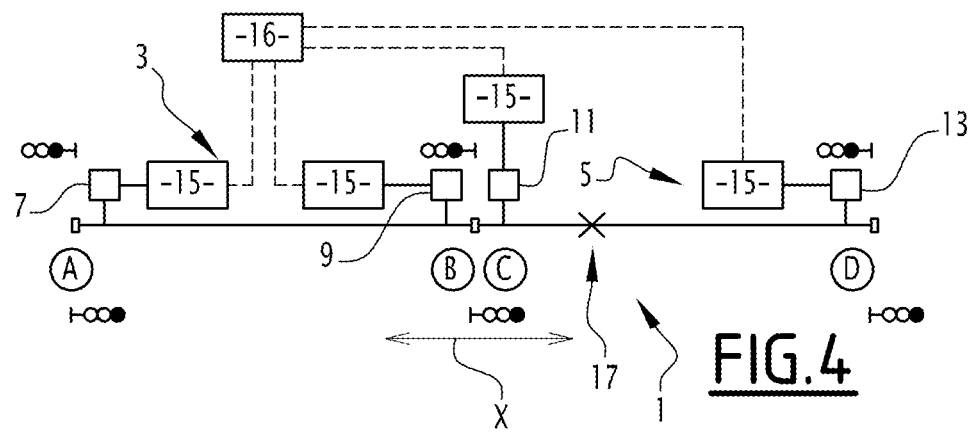
FIG. 4 shows schematically a track of a railway.

FIG. 4 shows schematically an example of a railway track 1. The railway track corresponds to the railway track in FIG. 1 and the same features are designated with the same reference signs. In contrast to the railway track of FIG. 1, a rail of the railway track 1 breaks in the second section 5 at 17 underneath a passing train. In other words a passing train causes the broken rail.

Figure 5:
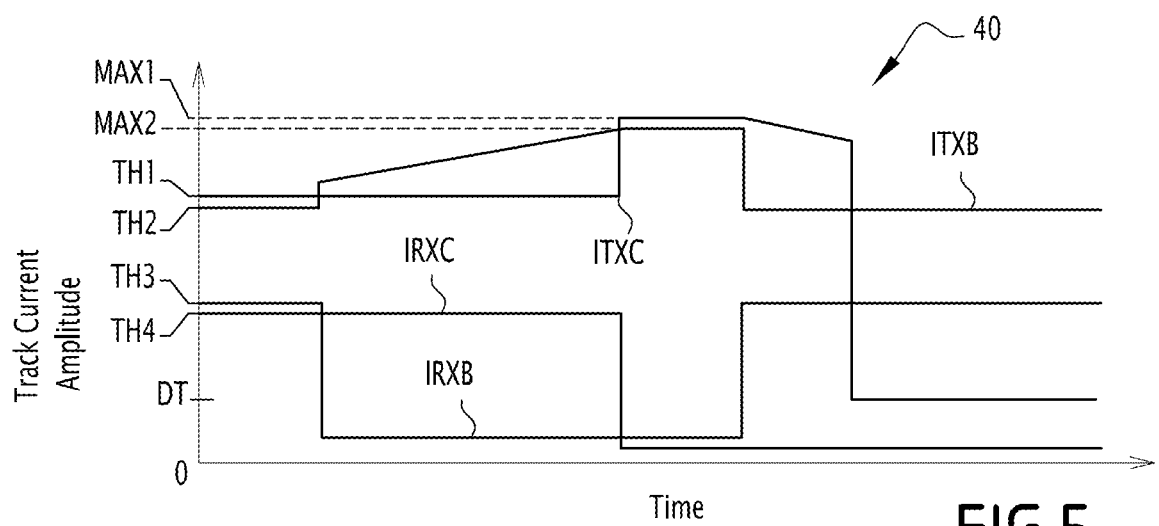
FIG. 5 shows schematically amplitudes of detected currents over time, when a train moves on along the track of FIG. 4.

FIG. 5 shows the detected currents in the track, which correspond to the detected currents in FIG. 3, in particular ITX B shows the DC current transmitted by the second transceiver 9. IRX B shows the DC current received by the second transceiver 9, which was emitted by the first transceiver 7. ITX C shows the DC current transmitted by the third transceiver 11. IRX C shows the DC current detected by the third transceiver 11, which was emitted by the fourth transceiver 13. The horizontal axis shows the time and the vertical axis shows the amplitude as an entire train moves into the first end A of the first section 3 through the second end D of the second section 5. It should be noted that in FIG. 3 the amplitudes of the DC currents is shown. In other words, if the current signals include a pulsed signal, the curves shown in FIG. 5 correspond to the amplitude of the pulses.

As the train passes the first section 3, the currents behave like in the embodiment explained with respect to FIG. 3. Thus, only the differences with respect to FIG. 3 will be explained in view of FIG. 5.

At 40, when the last axle or the rear of the train passes the location of the broken rail, the detected transmit current ITX C drops sharply to a level much below the level TH1. According to an embodiment, the controller 15 may identify and calculate the location of the broken rail based on the level of the detected transmit current ITX C at the third transceiver 11 just before the abrupt drop or change. In other words, the position of the rear or rear axle of the train is determined as explained for the FIG. 3, for the moment before the abrupt drop or change. Further, the detected transmit current ITX C will continue to stay at the low level indefinitely and the detected receive current IRX C at the third transceiver 11 will stay well below the detection threshold DT indefinitely even as the rear of the train clears the block between transceivers 11 and 13. In an alternative embodiment, the central controller 16 may perform these calculations.

According to embodiments, the front and rear of a passing train can be located, as well as detect any broken rails between following trains.

Figure 6:
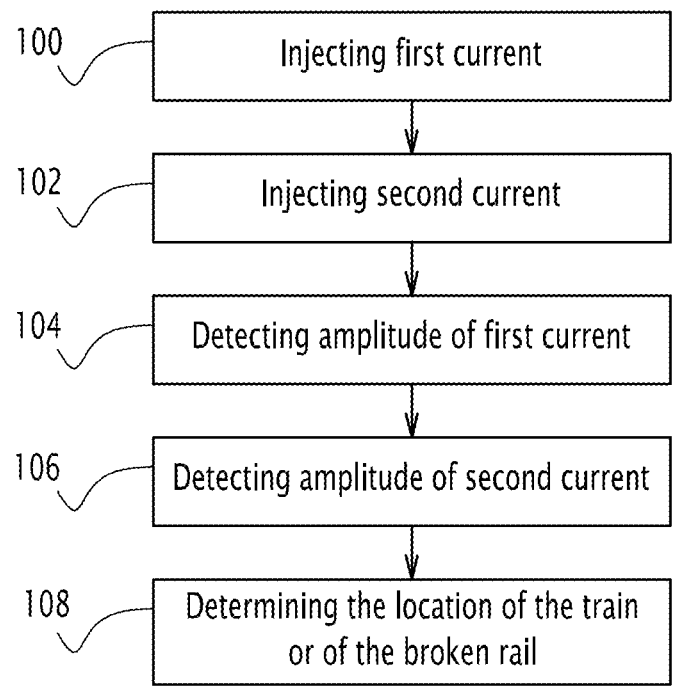
FIG. 6 shows a flowchart of a method according to an embodiment.

FIG. 6, shows a flow chart of an embodiment for determining the location of train on a track or of a broken rail of a track. The track may include a first section 3.

In a first step 100, a first current is injected at a first end, for example at the first end A of the first section 3. The first current may be a pulsed DC current, in particular injected by the first transceiver 7, for example the transmitter of the first transceiver 7.

In further step 102, a second current is injected at a second end B of the first section 3. For example the second current is a pulsed DC current, in particular injected by the second transceiver 9, for example the transmitter of the second transceiver 9.

In box 104, the amplitude or level of the first current at the first end is detected, for example by the first transceiver 7.

In box 106, the amplitude or level of the second current, here the transmit current ITX B, is detected at the second end, for example by the second transceiver 9.

In step 108, the controller 15 determines or calculates based on at least one of the detected amplitude of the first (transmit) current and the detected amplitude of the second (transmit) current the location of the train on the track or of the broken rail of the track. For example the controller takes into account the standard level TH1, TH2, TH3, TH4 of the detected currents, when no train is present in a section and no rail is broken, and/or a detection threshold DT, which indicates that a train is present in case a detected current from another transceiver falls below that level. In an alternative embodiment, the central controller 16 may perform these calculations.

What is claimed is:

1. A method for determining a location of a train on a track or a location of a broken rail of the track, the track including a first section having a first end and a second end, the train traveling from the first end to the second end of the first section, the method comprising:
   injecting a first current into the track at the first end;
   detecting an amplitude of the first current at the same end at which the first current was injected;
   recording the detected amplitude of the first current at the first end;
   detecting that the amplitude of the first current at the first end drops below a first nominal reception level, the first nominal reception level corresponding to a detected amplitude of the first current at the first end when no train is present on the first section and no rails are broken;
   determining, in a case where the amplitude of the first current at the first end has dropped below the first nominal reception level, that a rail has been broken; and
   determining the location of the broken rail, in a case where it has been determined that the rail has been broken, based on the recorded amplitude of the first current at the first end, at a time when or immediately before the amplitude drops below the first nominal reception level.

2. The method of claim 1, further comprising determining the location of a first end of the train on the track, wherein the first end detection is based on the detected amplitude of the first current at the first end.

3. The method of claim 2, further comprising injecting a second current at the second end of the first section of the track, detecting an amplitude of the injected second current at the second end of the first section of the track, and determining the location of a second end of the train on the first section of the track, the second end of the train being, in a driving direction, opposite to the first end of the train, based on the detected amplitude of the second current at the second end of the first section of the track.

4. The method of claim 1, wherein the first current is a pulsed DC current.

5. The method of claim 1, wherein the first nominal reception level further corresponds to a maximal level, when an axle of the train is positioned adjacent to the first end, where the first current is injected.

6. The method of claim 5, wherein the first nominal reception level is adapted in regular time intervals.

7. The method of claim 1, further comprising:
   determining a change of the amplitude with respect to the time of the first current; and
   determining a direction of travel of the train based on the change of amplitude.

8. The method of claim 7, wherein at least one of the amplitude of a second current injected and detected at the second end of the first section increases, and the amplitude of the first current injected and detected at the first end of the first section decreases.

9. The method of claim 1, wherein the determination of the location of the broken rail is further based on the detected first current falling below a minimum threshold, when a last axle of the train has just passed the broken rail location.

10. A controller for determining a location of a train on a track or a location of a broken rail of the track, the track including a first section having a first end and a second end, the train traveling from the first end to the second end of the first section, wherein the controller is adapted:
    to be connected to a first transmitter and first detector, the first transmitter and the first detector being located at the first end of the first section, wherein the first transmitter is adapted to inject a first current at the first end into the track, the first detector being adapted to detect an amplitude of the first current emitted by the first transmitter;
    to receive, from the first detector, the detected amplitude of the first current, which was transmitted at the same end;
    to record the detected amplitude of the first current at the first end, wherein the first current was injected at the first end;
    to detect that the amplitude of the first current at the first end drops below a first nominal reception level, the first nominal reception level corresponding to a detected amplitude of the first current at the first end when no train is present on the first section and no rails are broken;
    to determine, in a case where the amplitude of the first current at the first end has dropped below the first nominal reception level, that a rail has been broken; and
    to determine the location of the broken rail, in a case where it has been determined that the rail has been broken, based on the recorded amplitude of the first current at the first end, at a time when or immediately before the amplitude drops below the first nominal reception level.

11. The controller of claim 10, wherein the controller is further adapted:
    to be connected to a second transmitter and second detector respectively located at the second end of the first section, wherein the second transmitter is adapted to inject a second current at the second end and the second detector being adapted to detect an amplitude of the second current emitted by second transmitter; and
    to determine a location of a second end of the train on the track directed towards the second end of the section, the second end of the train being, in a driving direction, opposite to a first end of the train based on the detected amplitude of the second current at the second end.

12. The controller of claim 10, wherein the determination of the location of the first end of the train on the track or the location of the broken rail of the track is based on the first nominal reception level of the detected amplitude of the first current, which corresponds to a predefined or observed amplitude, when no train is in the first section and no rails are broken, and a maximal level, when an axle of the train is positioned adjacent to the first end where the first current is injected.

13. A system for determining a location of a train on a track or a location of a broken rail of the track, the track including a first section having a first end and a second end, the train travelling from the first end to the second end of the first section, the system comprising:
    a first transmitter at the first end of the first section, wherein the first transmitter is adapted to inject a first current at the first end into the track;

a first detector at the first end of the first section, wherein the first detector is adapted to detect an amplitude of the first current emitted by first transmitter; and a controller being connected to the first transmitter and the first detector, wherein the controller is adapted to receive, from the first detector, the detected amplitude of the first current, which was transmitted at the same end, to record the detected amplitude of the first current at the first end, to detect that the amplitude of the first current at the first end drops below a first nominal reception level, the first nominal reception level corresponding to a detected amplitude of the first current at the first end when no train is present on the first section and no rails are broken, to determine, in a case where the amplitude of the first current at the first end has dropped below the first nominal reception level, that a rail has been broken, and to determine the location of the broken rail, in a case where it has been determined that the rail has been broken, based on the recorded amplitude of the first current at the first end, at a time when or immediately before the amplitude drops below the first nominal reception level.

* * * * *